Aug. 21, 1928.
W. M. GLOVER
1,681,292
AUTOMOBILE AWNING
Filed Feb. 21, 1927     2 Sheets-Sheet 1
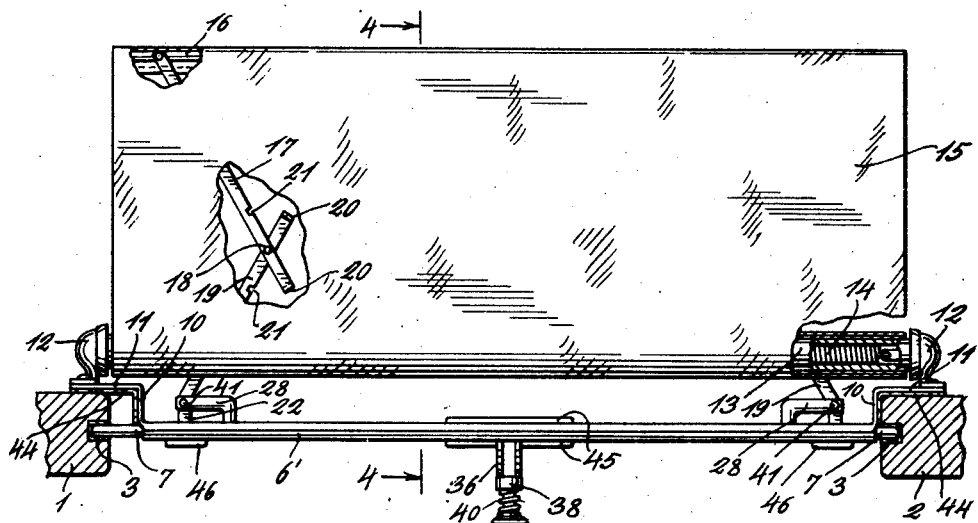
Inventor
William M. Glover.
By A. J. O'Brien
Attorney Aug. 21, 1928.  W. M. GLOVER  1,681,292
AUTOMOBILE AWNING
Filed Feb. 21, 1927  2 Sheets-Sheet 2

Inventor
William M. Glover.
By A. J. O'Brien
Attorney

Patented Aug. 21, 1928.

1,681,292

UNITED STATES PATENT OFFICE.

WILLIAM M. GLOVER, OF DENVER, COLORADO.

AUTOMOBILE AWNING.

Application filed February 21, 1927. Serial No. 169,830.

This invention relates to improvements in awnings for automobiles.

In the closed car construction so extensively employed, the windows in the front doors are, as a rule, not provided with any shades for the reason that it is imperative that the driver shall have an unobstructed view to each side of the road. When the sun is shining brightly and especially when it is low, as in the early morning or towards evening, the people in the front seat are often made uncomfortable by the strong sunlight which strikes them. In order to protect the driver and others in the front seat from the rays of the sun without obstructing the view, it has been proposed to provide the front doors with outwardly and downwardly extending awnings which are secured rigidly to the car door above the window opening. Such awnings, as a rule are fastened to the door by means of screws or bolts and are difficult to install and after they have once been installed, they cannot be removed for the reason that the various holes that have been drilled serve to deface the finish of the car, besides this, these stationary awnings are unsatisfactory for the reason that they cannot be adjusted and always occupy the same position. In order to facilitate installation and removal of this type of awning, it has been proposed to so construct them that they can be clamped in the window opening in such a way that they can be readily applied and removed. And it is to this general type of awning, that my present invention relates.

It is obvious that an awning of this type, in order to give the most satisfactory service, should be so constructed that it can be readily adjusted to any desired angle and which can be rolled up or extended at will.

It is the object of this invention to produce an awning that can be readily clamped in place in the window openings in the front doors of an automobile and which shall be provided with means comprising a handle located on the inside for tilting the awning to any desired angle and for extending or retracting the same as may be desired.

My invention, briefly described, comprises a supporting member which is preferably made of sheet metal and which is provided at opposite ends with U-shaped clamping members that are spring pressed and which are adapted to engage the grooves in the opposite sides of the window opening so as to hold the supporting member in place.

A spring roller is secured to the outside of this supporting member and to this roller one end of the shade is fastened; a handle is secured to the supporting member and projects inwardly so as to be accessible from the inside of the automobile. Means is associated with this handle for extending the shade or awning and for adjusting its angle to any desired extent.

Having thus briefly described my invention, I will now proceed to describe the same in detail and reference for this purpose will be had to the accompanying drawings, in which the preferred embodiment thereof has been illustrated and in which:

Figure 1 is a top plan view of my improved awning showing the same in place in the window opening of a car door, parts being broken away to better disclose the construction;

Figure 2 is an inside side elevation of the awning support taken in the direction of arrow 2, in Figure 4, with parts shown in section;

Figure 3 is a section partly broken away taken on line 3—3, Fig. 2;

Figure 4:
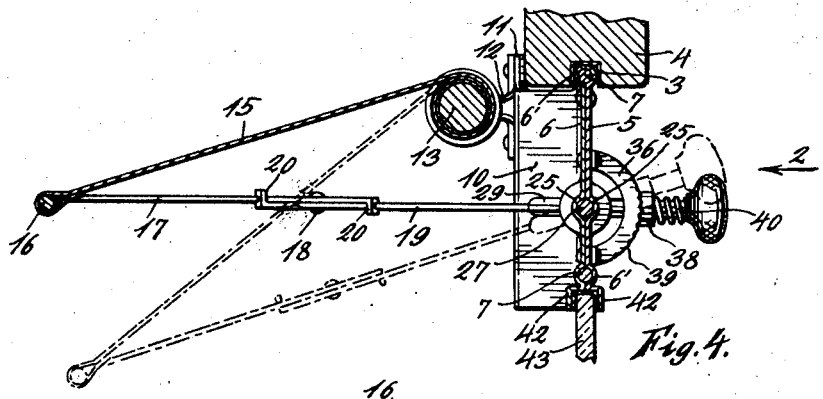
Figure 4 is a section taken on line 4—4, Figure 1.

In the drawing reference numerals 1 and 2 indicate the side members of the front door of an automobile. These side members have grooves 3 for the reception of the glass panel which is slidably mounted therein. Numeral 4 designates the top piece of the door, which connects the side members 1 and 2. This member, like 1 and 2, has a groove 3 which is adapted to receive the upper edge of the glass when the same is moved to closed position.

My awning support is formed from two sheet metal parts 5 and 6, which are bent into shape by some suitable die and which are each provided, parallel with their opposite edges, with semi-circular grooves 6', which, when the parts are assembled in operable position, form a circular opening for the reception of the parallel sides 7 of the U-shaped clamping members whose transverse portions 8 are adapted to engage the grooves 3 in the side members 1 and 2.

Springs 9 are positioned between the ends of the members 7 and serve to force the U-shaped clamping members outwardly into engagement with the bottom of the grooves 3, so as to produce the necessary friction to hold the supporting member securely in place. The plate 6 has its ends bent outwardly in the manner indicated by numeral 10 and thence into a direction parallel with the main body of the supporting member so as to form extensions indicated by numeral 11. Secured to the outer end of extensions 11, are supporting brackets 12 to which the ends of the spring roller 13 are rotatably connected. The spring roller is constructed in an old and well known way and will therefore not be described in detail, but reference will be made to the spring 14, which tends to rotate the roller in such a direction that the shade 15 will be rolled onto it in the manner corresponding to that of an ordinary roller shade. The outer end of the shade portion 15 is secured to a bar 16, which extends through a suitable hem in the outer end of the shade. Pivoted to the bar 16 near the opposite ends thereof are toggle members 17, which are pivoted at 18 to corresponding toggle members 19. It will be observed that the pivot points 18 are intermediate the ends of the toggle members 17 and 19. The ends of these toggle members are bent at right angles in the manner indicated by numeral 20 and these offset ends are notched and are adapted to engage with notches 21 in the cooperating toggle members so as to form a stop which prevents or limits movement in one direction.

Figure 5:
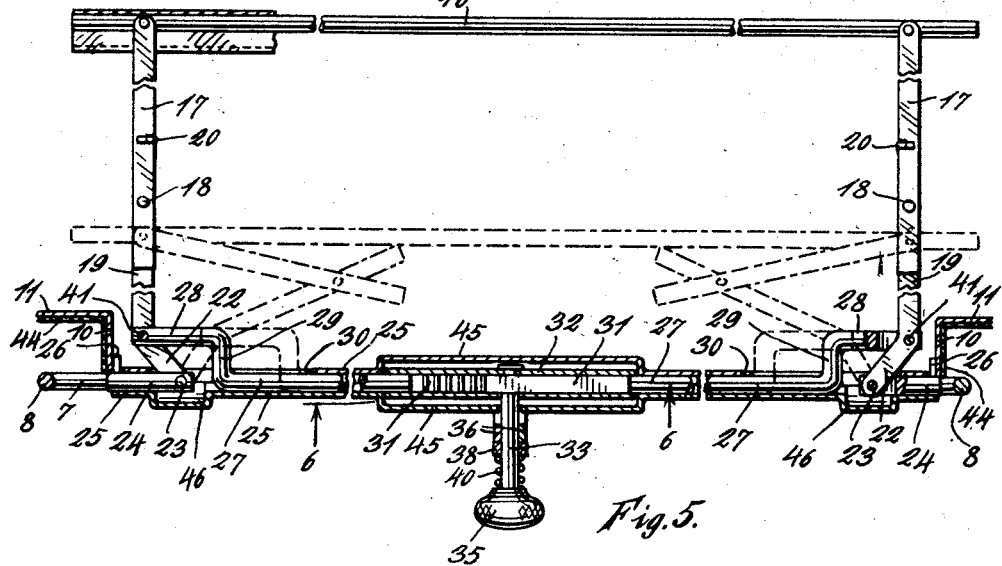
Figure 5 is a section taken on line 5—5, Figure 2, and shows by means of dotted lines one of the positions of the parts.

Referring now more particularly to Figure 5, it will be observed that the toggle members 19 have their free ends 22 bent at an angle to the main portion of the member. The extreme end of the bent part 22 is pivotally attached at 23 to a short pin 24, which is rotatably supported in the end of the circular opening formed by the curved portion 25. Members 24 are provided near their outer ends with pins 26, which limit their endwise movement, but which are located in a slot that permits the pins 24 to rotate about their axes to a limited extent. By referring to Figure 4, it can be seen that when the toggles formed by members 17 and 19 are extended in the manner shown in full lines in Figure 5, that the shade 15 is projected and extends from the bar 16 to the roller 13 so as to form an awning that extends outwardly from the side of the car. Since the inner ends of the toggle members 19 are pivoted to the pins 24, it is evident that these toggles may be rotated about the axes of these pins from the position shown in full lines in Figure 4, to the position indicated by dot and dash lines. The parts are capable of a much greater movement than indicated in Figure 4, in fact the awning is so constructed that the shade 15 may be moved from a position in which it is horizontal to a position in which it is practically vertical. The extent of this movement has not been shown for the reason that it is merely a matter of degree and follows from the construction of the device.

Figure 6:
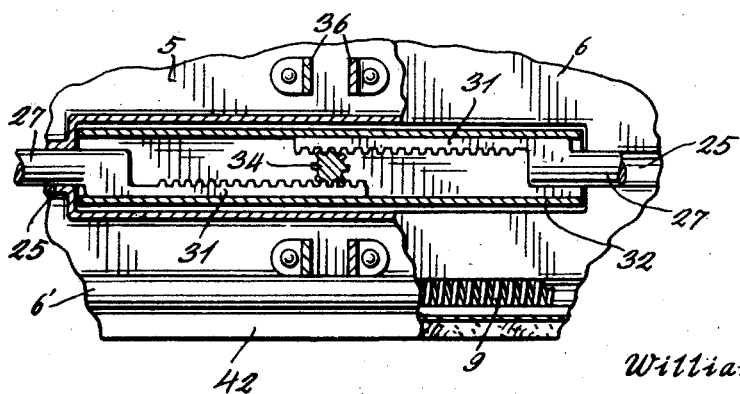
Figure 6 is a section taken on line 6—6, Figure 5.

For the purpose of conveniently controlling the toggles and for adjusting the inclination of the shade, I have provided the following mechanism. Located in the circular opening, provided by the two semi-circular portions 25, are two bars which are duplicates and which have been indicated by numeral 27. These bars have their outer ends 28 offset so that their axes lie in a line parallel with, but spaced from the axes of the main portions 27. The part 29, which connects the parts 28 to the main part of the bars 27 extends through a slot 30 in the member 6. The other ends of the bars 27 are provided with racks 31 (Figure 6) and these are slidably connected within tubular enclosure 32, which permits them to move longitudinally, but prevents them from moving away from each other. A rod 33 is provided at one end with gear teeth so as to form a pinion 34, that is located between the racks 31 and engages the teeth of the latter. This rod 33 is rotatably mounted in suitable openings in the tubular enclosure 32 and when it is rotated about its axis it will move the bars 27 in opposite directions. The rod 33 is provided with a suitable handle 35 and passes through a space between the two semi-circular guide members 36 (Figures 2, 3 and 4). A washer 38 is slidably mounted on the bar 33 and this washer has one side provided with projections which engage the teeth 39 on the arcuate members 36. A spring 40 is located between the washer 38 and the handle 35 and tends to move the washer 38 into engagement with the arcuate members 36, so as to hold the parts in adjusted position. When the handle 35 is moved upwardly or downwardly, the bars 27 will be rotated about their axes in the manner apparent from the drawings. The extreme ends of the parts marked 28 are pivoted at 41 to the toggle members 19 at the point where the part 22 joins the body of the toggle 19. By referring to Figure 5, it will be observed that when the parts occupy the position shown in full lines the toggle members 17 and 19 lie practically in a straight line and that the parts are therefore in fully extended position, which corresponds to the full line position shown in Figure 4. If the bar 33 is now rotated in such a direction as to move the bars 27 towards each other, it is evident that the pivot points 41 will be brought closer together and since the inner ends of the parts 22 are pivoted at 23 to the pins 24, and since the latter are held against longitudinal movement, the toggles 19 will be gradually inclined towards each other until they finally assume the position shown by dot and dash lines. As the toggle members 19 are pivoted to toggle member 17, the latter will, of course, move whenever toggle members 19 are moved, and will finally assume the position shown in dot and dash lines in Figure 5. When the parts are moved from full line to dot and dash line position shown in Figure 5, the shade 15 is wound upon the roller 13, through the action of the spring 14.

From the above description it will be apparent that by means of the handle 35 and associated parts, a person sitting within the car is able to extend the awning or to fold it by merely rotating the handle and that he is also enabled to adjust the inclination of the shade by moving the handle upwardly or downwardly in the manner indicated in Figure 4. My supporting device is provided along its lower edge with a groove formed by the parallel flanges 42 and this groove is adapted to receive the upper edge of the glass closer 43 so that whenever it is necesary or desirable, the car may be entirely closed so as to exclude cold air or rain without making it necessary to remove the awning.

Again, referring to Figure 4, it will be observed that the upper edge of the supporting part of my awning extends into the groove in the transverse top piece 4, so as to form a close connection between it and the door frame. The parallel extensions 11 to which the curtain rod brackets 12 are secured have a lining 44 of felt which prevents marring of the finish of the car and also serves to form a close connection between the supporting frame and the car structure. It is apparent from the above that with my awning in place the car can be closed up substantially as tight as if the awning was not in place and therefore this awning can be employed during cold winter weather with the same amount of comfort as in summer weather.

I want to call particular attention to the construction by means of which the awning is held in place, as by means of the extensible U-shaped members this awning may be so constructed that it can be applied to cars having window openings of varying sizes so that it is not necessary to carry a large stock on hand in order to fit the different sizes of window openings, as one awning construction can be employed in connection with practically every known make of automobile.

It is evident that the actual construction may be changed from that shown and still obtain the operation described and I want it understood that the embodiment illustrated is merely given as one example and that changes can be made within the scope of the appended claims.

The feature of construction which I consider of the greatest importance in connection with this awning is that it permits a person located on the inside of the car to control the awning without opening the car door and which, therefore, makes it possible to tilt the awning so as to get the best results and to fold it so as to provide the greatest opportunities for observation.

It will be observed that the tubular member 32 and associated rack and pinion are entirely enclosed within a portion of the supporting member formed by the semi-circular outwardly pressed parts 45 and that the ends of the pins 24 to which the pivot pin 23 is secured are likewise enclosed in bent or bulged parts 46. This makes the supporting member entirely impervious and its presence in the door opening does not therefore interfere at all in the comfort of the car in cold weather.

Having now described my invention, what I claim as new is:

1. An awning comprising, in combination, an elongated supporting member, a spring roller secured to one side thereof, a flexible shade having one end secured to said roller and adapted to be wound thereon, a handle rotatably mounted in the support and bodily movable on an axis at right angles to the axis of rotation, means controlled by the rotation of the handle for extending and retracting the shade and an operative connection between the handle and the shade to change its inclination during its body movement.

2. An awning comprising, in combination, an elongated supporting member, a spring roller secured to one side thereof, a flexible shade having one end secured to said roller and adapted to be wound thereon, a handle rotatably mounted and bodily movable in the support at right angles to its axis of rotation, means controlled by the rotation of the handle for extending and retracting the shade and means controlled by its body movement for tilting the shade.

3. An awning adapted to be secured in a window opening, comprising, in combination, a support formed from two reversely arranged plates of sheet metal, each of which has a plurality of semi-circular longitudinally extending parallel grooves which plates are assembled to form openings, the said plates forming a webbing between the openings, clamping members slidably secured in opposite ends of two of said openings, springs separating the adjacent ends of said members and a shade secured to one side of said support.

4. An awning adapted to be secured in a window opening, comprising, in combination, a support formed from two reversely arranged sheet metal plates, each of which has a plurality of semi-circular longitudinally extending parallel grooves which plates are assembled to form openings and an intermediate webbing, clamping members slidably secured in opposite ends of two of said openings, springs separating the adjacent ends of said members, a shade secured to one side of said support, a handle secured to the support and means controlled by the handle for regulating the position of the shade.

5. An awning adapted to be secured in a window opening, comprising, in combination, an elongated support, resilient means for securing the support to the sides of the opening, a spring roller secured to the outside of the support, a shade having one end secured to the roller and the other end secured to a movable bar, a handle rotatably and pivotally connected to said support, means controlled by a rotary movement of the handle for moving said bar towards or away from the support and means controlled by a pivotal movement of the handle for moving said bar upwardly and downwardly.

6. An awning adapted to be secured in a window opening, comprising, in combination, an elongated support, resilient means for securing the support to the sides of the opening, a spring roller secured to the outside of the support, a shade having one end secured to the roller and the other end secured to a movable bar, a handle rotatably and pivotally connected to said support, means controlled by a rotary movement of the handle for moving said bar towards or away from the support and means controlled by a pivotal movement of the handle for moving said bar upwardly and downwardly, the means for controlling the position of the bar comprising two pair of toggles, one end of each pair being pivotally connected with one end of said bar and the other end of each pair being pivotally connected with the support.

7. An awning adapted to be secured in a window opening, comprising, in combination, an elongated support, means for fastening the support to the window frame, a pair of toggle members pivotally attached to each end of said support, a bar pivotally attached to the other ends of said toggles, two bars slidably connected with said support, each of said bars having one end pivotally connected with one of said toggle members, means comprising a handle for moving said bars longitudinally with respect to each other whereby the toggles will be extended or collapsed and for tilting said toggles.

8. An awning comprising, in combination, a support, spring pressed members secured to the support and extending longitudinally thereof for holding the support in place in an opening, a spring roller secured to the outside of the support, a flexible shade having one end fastened to the roller, a bar secured to the other end of the shade, a toggle secured to each end of said bar, the other end of the toggle being pivotally connected with the support, a handle secured to the support and projecting from the side opposite from the shade and means connecting the handle to the toggles so that the position of the latter can be controlled by the former.

9. An automobile awning comprising, in combination, a support adapted to be mounted on the vehicle, a shade roller operatively mounted on the support, a shade having one end secured to said roller, a handle rotatable in the support and also bodily movable on an axis at right angles to the axis of rotation, and an operative connection between the handle and the shade beyond the roller whereby the shade may be withdrawn and extended by one of said movements of the handle, and bodily tilted to change its inclination by the other movement of the handle.

10. In a structure of the class described, the combination of a support mounted on the vehicle, a spring roller operatively mounted in the support, a shade having one end secured to the roller, a handle rotatably mounted in the support and also having swinging movement on an axis at right angles to its axis of rotation, and an operative connection between the handle and the shade beyond the roller to permit the withdrawal and extension of the shade by the rotary movement of the handle and to cause the changing of its inclination by the swinging movement of the handle.

11. In a structure of the class described, the combination of a support suitably mounted on the vehicle, a shade operatively connected with the support for withdrawal and extension, a handle journaled in the support and also movable on an axis at right angles to the axis of its journal, means connecting the handle with the shade to permit the latter to be extended and withdrawn when the handle is moved in its journal and to cause the inclination of the shade to be changed by the other movement of the handle.

12. An automobile awning structure, comprising in combination, a support yieldably mounted in the window opening of the car, a shade connected at one end with the support, a handle rotatably mounted in the support and also movable bodily on an axis at right angles to the axis of rotation, and means operatively connecting the handle with the shade beyond the support so that the shade may be extended and furled by one movement of the handle and tilted to the desired angle of inclination by the other movement of the handle.

13. An automobile awning structure comprising, in combination, a support mounted in the window opening of an automobile, a flexible shade connected at one end with the support, a rod applied to the opposite end of the shade, a handle rotatably mounted in the support and also mounted to swing on an axis at right angles to the axis of rotation, and an operative connection between the handle and the rod of the shade whereby the latter may be extended and furled by one of said movements of the handle and tilted to the desired angle of inclination by the other of said movements.

14. In combination, a support mounted in the window opening of an automobile, a shade connected with the support at one end, a controlling member mounted in the support to move on axes at right angles to each other, and means connecting the controlling member with the opposite end of the shade to cause the latter to be extended and withdrawn by one movement and tilted to the desired inclination by the other movement of the controlling member.

15. In an automobile awning structure the combination of a support mounted in the window opening of a car, a flexible shade connected at one end with the support, a handle pivoted in the support and bodily movable on an axis at right angles to its axis of rotation, and an operative connection between the handle and the other end of the shade to cause the latter to be extended and withdrawn by one movement and adjusted to vary its inclination by the other movement of the handle.

In testimony whereof I affix my signature.

WILLIAM M. GLOVER.